US005292572A

United States Patent [19]

Koshizuka et al.

[11] Patent Number: 5,292,572

[45] Date of Patent: Mar. 8, 1994

[54] HEAT-TRANSFER IMAGE RECORDING MEDIUM

[75] Inventors: Kunihiro Koshizuka, Hachioji; Toshiaki Tezuka, Tokorozawa; Shigeru Mano; Toshihisa Takeyama, both of Hachioji; Takao Abe, Tokyo, all of Japan

[73] Assignee: Konica Corporation, Tokyo, Japan

[21] Appl. No.: 938,679

[22] Filed: Sep. 1, 1992

Related U.S. Application Data

[63] Continuation of Ser. No. 556,387, Jul. 24, 1990, abandoned.

[30] Foreign Application Priority Data

Jul. 26, 1989 [JP] Japan .................................. 1-194846

[51] Int. Cl.[5] .................................................. B32B 9/00

[52] U.S. Cl. .................................... 428/195; 428/204; 428/206; 428/207; 428/337; 428/424.2; 428/424.6; 428/480; 428/484; 428/488.1; 428/500; 428/913; 428/914

[58] Field of Search ...................... 428/195, 484, 488.1, 428/488.4, 913, 914, 206, 207, 500, 480, 423.1, 337, 424.2, 424.6, 200, 213, 204, 484

[56] References Cited

U.S. PATENT DOCUMENTS 4,927,695 5/1990 Koshizuka et al. ................. 428/141

5,035,953 7/1991 Kanno et al. .................... 428/488.4

FOREIGN PATENT DOCUMENTS 60-107392A 6/1985 Japan .

61-254394A 11/1986 Japan .

*Primary Examiner*—Patrick J. Ryan

*Assistant Examiner*—William A. Krynski

*Attorney, Agent, or Firm*—Finnegan, Henderson, Farabow, Garrett & Dunner

[57] ABSTRACT

A heat-transfer recording medium is disclosed, which produces no lowering in transfer density even when the medium is used under such higher-temperature conditions as in a facsimile equipment and is capable of providing an easily readable transferred image having a low surface gloss, as well as having an excellent keep-secrecy and producing few voids. The recording medium comprises a support; a heat-transfer layer, provided on the support, comprising a thermo-fusible substance and a colorant; and a non-transfer layer which is interposed between the support and the transfer layer and comprises a colorant, a thermoplastic polymer selected from the following Group A and a thermoplastic polymer selected from the following Group B:

Group A: an α-olefin polymer, an α-olefin-maleic anhydride copolymer, an α-olefin-alkyl acrylate and methacrylate copolymer, an α-olefin-vinyl acetate copolymer, an α-olefin-acrylic or methacrylic acid copolymer, a vinyl acetate polymer, an alkyl acrylate or methacrylate polymer, a acrylic or methacrylic acid polymer and a styrene-containing polymer;

Group B: A polyester resin, a polyurethane resin, a polyvinyl chloride resin and an epoxy resin.

22 Claims, 1 Drawing Sheet

HEAT-TRANSFER IMAGE RECORDING MEDIUM

This application is a continuation of application Ser. No. 07/556,387 filed Jul. 24, 1990, now abandoned.

FIELD OF THE INVENTION

This invention relates to a heat-transfer image recording medium and, particularly , to a heat-transfer image recording medium which, for example, produces no transfer-density-lowering even when the medium is used under such high-temperature conditions as in a facsimile equipment, in which heat is easily regenerated, and is capable of providing an easily readable printed image having a low surface gloss, as well as having an excellent keep-secrecy and producing few voids.

BACKGROUND OF THE INVENTION

In recent years, the attempts have been made by adopting heat-transfer image recording systems to facsimile equipment so as to improve the preservability of recorded images to make them better than in the conventional heat-sensitive image forming systems applied to facsimile equipments, as well as to make it possible to print the images on plain paper sheets.

There has, however, been a problem that the printed images obtained from the conventional heat-transfer image recording media are hardly readable because the surfaces thereof are high in gloss.

There have been proposed, for example, a heat-transfer image recording medium interposed a mat layer containing a resin and a mat pigment between a support and an ink layer so as to diminish the gloss of transferred images, or another heat-transfer image recording medium interposed an anchor layer capable of forming fine unevenness on the pealable surface of an ink layer so as to diminish the gloss of transferred images.

Though the heat-transfer image recording media mentioned above may be able to diminish the gloss of transferred images, when using a heat-transfer image recording medium such as shown in FIG. 2, for example, with a facsimile equipment easily become regenerative in high-temperature conditions because the power is being switched ON all day long, there have been the following problems; Ink layer A containing a heat-fusible substance is liable to be peeled off from the inside of the ink layer so as to hinder ink layer A from peeling off from interface C between the ink layer A and a mat or anchor layer that is expected to be the peelable surface of ink layer A and, therefore, the thickness of ink layer A which is to be resultingly transferred onto a subject transferred medium becomes thinner so as to lower a transferred image density. In FIG. 2, D is a support member.

In the conventional heat-transfer image recording media have a problem that the keep-secrecy is liable to leak out, because readable portions so called 'white clearness portions' are so produced as to correspond to the configurations of transferred images after the ink layer is transferred to a transferred subject medium.

For trying to improve the quality of printed images formed on heat-transfer image recording media so as to obtain sharp and clear printed images, it is desirable to make void productions a few and resolving power higher.

SUMMARY OF THE INVENTION

It is one of the objects of the invention to provide a heat-transfer image recording medium which is capable of providing readily readable transferred images each having no density-lowering even in high-temperature conditions, a low surface-gloss, as well as it is excellent in keep-secrecy, few in void production, and high in resolving power.

The inventors have discovered the facts that a specific heat-transfer image recording medium, which is comprised of a non-transfer layer containing a specific substance and being interposed between a support and a transfer layer, provides no density-lowering because a transfer layer is peeled off by breaking a coagulation around the interface between the transfer layer and the non-transfer layer even in high-temperature conditions, and the recording medium can provide readily readable printed images because the surface gloss is low, as well as that the recording medium can be excellent in keep-secrecy, few in void production and high in resolving power, so that this invention have been achieved.

The heat-transfer image recording medium of the invention comprises a support, a transfer layer, provided on the support, containing a heat fusible substance and a colorant and a non-transfer layer which is provided between the support, and the non-transfer layer comprises a colorant, a polymer selected from the following Group A and a resin selected from the following Group B.

Group A

α-olefin polymer, an α-olefin-maleic anhydride copolymer, an α-olefin-alkyl(metha)acrylate copolymer, an α-olefin-vinyl acetate copolymer, an α-olefin-(metha)acrylic acid copolymer, polyvinyl acetate, polyalkyl(metha)acrylate, poly(metha)acrylic acid, and a styrene-containing polymer.

Group B

A polyester resin, a polyurethane resin, a polyvinyl chloride, and an epoxy resin.

DETAILED DESCRIPTION OF THE INVENTION

Figure 1A:
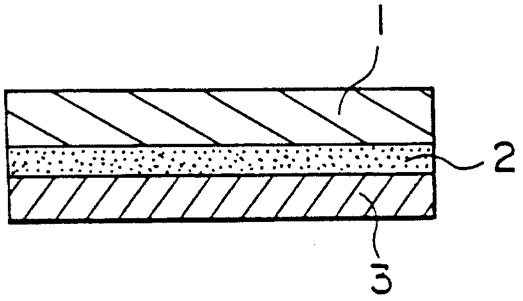
FIGS. 1-A and 1-B are explanatory cross-sectional views illustrating the relation between a transfer layer and a non-transfer layer of a heat-transfer image recording medium of the invention, respectively.

The heat-transfer image recording media of the invention will now be described by separating the supports, non-transfer layers and transfer layers.

SUPPORTS

The supports applicable to the heat-transfer image recording media of the invention are desirable to be excellent in heat-resistance and high in dimensional stability.

The raw materials thereof suitably applicable thereto include, for example, paper sheets such as plain paper, condenser paper, laminated paper and coated paper; resin films such as those made of polyethylene, polyethylene terephthalate, polystyrene, polypropylene and polyimide; composite materials of paper and resin film; and metal sheets such as those made of aluminium foil.

The thicknesses of the supports are, usually, not thicker than 30 μm and, preferably, within the range of 2 to 6 μm. When a thickness thereof exceeds 30 μm, there may be some instances where transferred image quality may be lowered because the thermal conductivity thereof is deteriorated.

In the heat-transfer image recording media of the invention, the back side of the support may be freely constituted. For example, it is allowed to provide such a backing layer as an anti-sticking layer.

Non-transfer layers

One of the important points in the invention is to interpose a non-transfer layer containing a polymer selected from the above-mentioned Group A and a resin selected from the above-mentioned Group B between the above-mentioned support and a transfer layer about which will be detailed later.

In the heat-transfer image recording media of the invention provided with the above-mentioned non-transfer layer, the later-described transfer layer can be peeled off from the support by a stable cohesive failure occurring around the interface between the non-transfer layer and the transfer layer even in high-temperature conditions, and sharp and clear readily readable transferred images can be so formed as to have a high density and a low surface-gloss.

To be more concrete, a transferred image can be so formed as to have no density-lowering because a transfer layer can be peeled off by a stable cohesive failure occurring around the interface between a non-transfer layer and the transfer layer even in high-temperature conditions and the transfer layer having a specific thickness can be transferred to a transfer subject medium and, in addition to the above, the non-transfer layer can produce very fine unevenness on the peeling surface of the transfer layer, i.e., the surface of the transferred image, so that the surface gloss of the transferred image can be diminished.

Further, the non-transfer layer not only remains on a support even after the transfer layer transfers to the transfer subject medium but also contains a colorant, therefore, the aforementioned clear white portions can be prevented from producing and the keep-secrecy of the heat-transfer image recording media of the invention can be made excellent.

The operation or function of the non-transfer layer mentioned above is derived from the aforementioned polymer, resin and colorant each contained in the non-transfer layer.

In the non-transfer layer the thermoplastic polymer selected from the aforementioned Group A (hereinafter sometimes referred to as Polymer A) and the thermoplastic polymer selected from the aforementioned Group B (hereinafter sometimes referred to as Polymer B), a proportion of Polymers A to B in the non-transfer layer is preferably within the range of 3:97 to 97:3, and, more preferably, 10:90 to 90:10 by weight.

In the mixture thereof, if a proportion of the Polymer A is less than 3 wt %, there may be some instances where it may not be practically used because the non-transfer layer and the transfer layer are lowered in adhesion to each other. If a proportion of Polymer B is less than 3 wt %, on the other hand, there may be some instances where the non-transfer layer may be peeled off from the support, which should remain on the support even after the transfer layer transfers to the transfer subject medium, because the non-transfer layer and the transfer layer are lowered in adhesion to each other.

In any of the instances, there may be some instances where the effects of the invention may not satisfactorily be displayed if the proportions of Polymers A and B are out of the above-given ranges.

Polymer A is a compound preferably having a melt-index, a MI value, within the range of, usually, 1 to 3,000 and, more preferably, 5 to 1,000. The more prefeable Polymer A include, typically, a polymer of an α-olefin such as ethylene and propylene; a copolymer of an α-olefin and maleic anhydride such as maleic anhydride-modified ethylene-vinyl acetate copolymer, that is so-called maleic anhydride-modified EVA;, a copolymer of an α-olefin and alkyl acrylate and methacrylate such as an ethylene-ethyl acrylate copolymer, EEA, and an ethylene-methyl methacrylate copolymer, EMMA,; a copolymer of an α-olefin and vinyl acetate such as an ethylene-vinyl acetate copolymer, EVA,; a polyvinyl acetate; an alkylacrylate and methacrylate polymer such as polymethyl methacrylate, MMA, and polybutyl methacrylate, BMA,; a polyacrylic acid, AA, and polymethacrylic acid, MAA,; and a styrene-containing polymer such as polystyrene, styrene-acrylic acid copolymer, a butadiene-styrene copolymer, a isoprene-styrene copolymer and a olefin-styrene copolymer.

The preferable compounds selected from Group A include an ethylene-vinyl acetate copolymer (EVA), ethylene ethyl-acrylate and a styrene-type polymer and the more preferable compounds include a styrene-type polymer.

The aforementioned Polymer B selected from Group B is a compound preferably having a number average molecular weight within the range of, usually, 1,000 to 100,000 and, more preferably, 2,000 to 50,000.

Among the above compounds, a polyester resin is preferably used.

The preferable combinations of the above-mentioned Polymers A and B each contained in a non-transfer layer include, for example, a combination of an ethylene-vinyl acetate copolymer and a polyester resin.

The non-transfer layer contains Polymers A and B of not less than 10 wt % and, preferably, within the range of 20 to 80 wt % in total.

The non-transfer layer contains the colorant, as well as the afore-mentioned thermoplastic polymers.

After the transfer layer transfers to the transfer subject medium, the colorant functions to prevent the production of the afore-mentioned so-called white clear portions.

It is, therefore, preferable that the color of the colorant contained in a transferred layer should be the same color as that of a transferring layer of which will be detailed later.

The colorants preferably applicable thereto include those similar to the colorants applicable to the transfer layer of which will be detailed later.

In the non-transfer layer, the aforementioned colorant is contained in a proportion of, usually, not more than 80 wt % and, preferably, within the range of 10 to 60 wt %.

The non-transfer layer is allowed to contain a thermo-fusible substance, as well as the aforementioned thermo-plastic polymer and colorant.

The above-mentioned thermo-fusible substances preferably applicable thereto include those similar to the thermo-fusible substances capable of being contained in a transfer layer, of which will be detailed later.

When the non-transfer layer contains the thermo-fusible substance, the thermo-fusible substance is contained in a proportion of, usually, not more than 50 wt % and, preferably, within the range of 2 to 50 wt %.

The non-transfer layer containing the above-mentioned components may be coated on the aforementioned support in a such a method as an aqueous coating method, a coating method in which an organic solvent is used, and a hot-melt method.

A thickness of the non-transfer layer is within the range of, usually, 0.3 to 5 μm and, preferably, 0.2 to 2 μm. When the thickness thereof is within the above-mentioned range, the objects of the invention can satisfactorily be achieved.

Over the non-transfer layer, a transfer layer described below is adjacently laminated.

Transfer layer

A transfer layer contains a thermo-fusible substance and a colorant.

The thermo-fusible substances include, for example, vegetable wax such as carnauba wax and Japan wax; animal wax such as beeswax, insect wax, shellac wax and spermaceti; petroleum wax such as paraffin wax, microcrystal wax, polyethylene wax, ester wax and oxidized wax; and mineral wax such as montan wax, ozokerite and ceresin. Besides the above-given wax, they further include, for example, higher aliphatic acids such as palmitic acid, stearic acid, margaric acid and behenic acid; higher alcohols such as palmityl alcohol, stearyl alcohol, behenyl alcohol, marganyl alcohol, myricyl alcohol and eikosanol; higher aliphatic acid esters such as cetyl palmitate, myricyl palmitate, cetyl stearate and myricyl stearate; amides such as acetamide, propionic amide, palmitic amide, stearic amide and amide wax; and higher amines such as stearyl amine, behenyl amine and palmityl amine.

The above-given substances may be used independently or in combination.

Among these substances, the preferable include the wax having a melting point within the range of 50° to 120° C. measured with a Yanagimoto MJP-2 Model instrument.

The transfer layer is preferable to contain the above-mentioned thermo-fusible substance in a proportion within the range of, usually, 30 to not more than 90 wt %.

The above-mentioned colorants include, for example, such a pigment as an inorganic or organic pigment and dyes.

The inorganic pigments include, for example, titanium dioxide, carbon black, zinc oxide, persian blue, cadmium sulfide, iron oxide and the chromates of lead, zinc, barium or calcium.

The organic pigments include, for example, those of the azo type, thioindigo type, anthraquinone type, anthanthrone type and triphenedioxazine type; vat dye pigments; phthalocyanine pigments such as those of copper phthalocyanine and the derivatives thereof; and quinacridone pigments.

The above-mentioned organic dyes include, for example, an acid dye, a direct dye, a disperse dye, an oil soluble dye, and a metal-containing oil soluble dye.

Among these various types of colorants, carbon black is particularly preferable to be used.

Transfer layers are each allowed to contain the above-mentioned colorants in a proportion within the range of, usually, 5 to 30 wt % and, preferably, 10 to 25 wt %.

The transfer layers are each further allowed to contain a thermoplastic resin as well as the above-mentioned thermo-fusible substances and colorants. When they contain the thermoplastic resin, the cohesive force may easily be controlled in the transfer layers.

The thermoplastic resins include, for example, a polyethylene resin and the copolymer resins thereof, a polypropylene resin, a polystyrene resin and the copolymer resins thereof, a methyl methacrylate resin, a polyvinyl chloride resin and the copolymer resins thereof, a polyvinylidene chloride resin, a polyvinyl acetate type resin, a cellulose type resin, an ionomer resin, a polyamide resin, a polyacetal, a polycarbonate resin, a polyester resin and a polyphenylene oxide, a polysulfone, a fluorine type resin, and a silicone resin.

These resins may be used independently or in combination.

Among the thermoplastic resins, an ethylene copolymer resin should be preferably used.

The ethylene copolymer resins include, for example, those of ethlene-vinyl acetate, ethylene-ethyl acrylate, ethylene-methyl methacrylate, ethylene-isobutyl acrylate, ethylene-acrylic acid, ethylene-vinyl alcohol, ethylene-vinyl chloride, and ethylene-metal acrylate.

When using the thermoplastic resins, a transfer layer contains the components of the thermoplastic resin in a proportion of, usually, not more than 50 wt % and, preferably, not more than 40 wt %.

Besides the above, the transfer layer is also allowed to contain a surfactant such as a compound containing a polyoxy-ethylene chain.

The transfer layer is further allowed to contain any inorganic or organic fine grains such as those of metals or silica gel, or oils such as linseed oil and a mineral oil.

Such transfer layer may be coated over the above-mentioned non-transfer layer in a coating method such as an aqueous system coating method or a coating method in which an organic solvent is used.

The layer thickness of the transfer layer is within the range of, usually, 0.5 to 8 μm and, preferably, 1.5 to 6.0 μm.

Others

The heat-transfer image recording media of the invention can be prepared usually in the manner that, after coating the foregoing non-transfer and transfer layers in order onto the above-mentioned support, the layer-coated support is processed in a drying step and a surface-smoothing step, if required, and is then cut into a desired shape.

The heat-transfer image recording media thus prepared may be used in the forms of a wide tape which are generally used in line-printers a type-writer ribbon, and they are prefeable to have a flat shape such as the shape of a sheet substantially having the same width as that of a recording paper sheet used in line-printers.

The heat-transfer methods applicable to the heat-transfer image recording media of the invention are not different from any usual heat-transfer image recording methods, however, the method of the invention will be detailed by taking an example of the cases where the most typical thermal-head is used as a heat source.

First, a transfer layer is brought into close contact with a medium subject to be transferred such as a plain paper sheet and a thermal pulse is given from a thermal-head so that a heat-softening colorant layer corresponding to a character or a pattern to be transferred is locally heated.

Figure 1B:
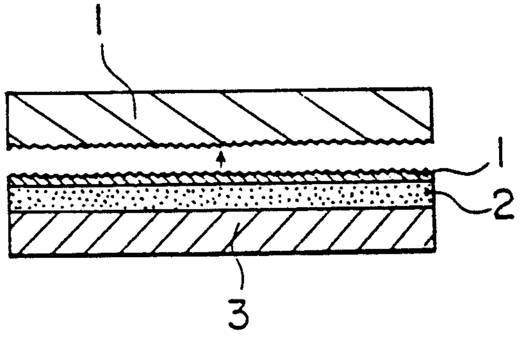
Figure 2:
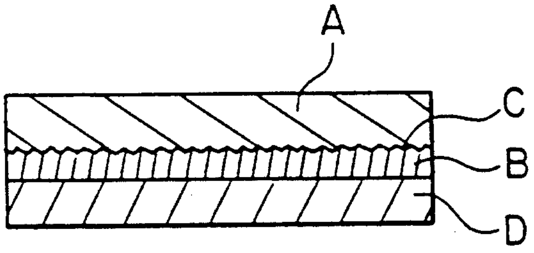
FIG. 2 is an explanatory cross-sectional view illustrating an example of conventional type heat-transfer image recording media.

The temperatures of the heated portions of the transfer layer are raised and, as shown in FIG. 1-A, transfer layer 1 is rapidly softened and peeled off from around the interface between transfer layer 1 and non-transfer layer 2 by a cohesive failure, so that the softened transfer layer is transferred imagewise onto the medium subject to be transferred. After transfer layer 1 is transferred, non-transfer layer 2 remains on support 3, as shown in FIG. 1-B.

EXAMPLES

Next, the examples of the invention and the comparative examples thereto will be given below so as to further detail the invention.

EXAMPLE 1

A non-transfer layer of the invention was formed in the manner that the following non-transfer layer compositions were coated on a 4.5 μm-thick polyethyleneterephthalate film in a wire-bar-using solvent coating method so that the layer could have a thickness of 1 μm extending over a length corresponding to the logitudinal width of a paper sheet having a size of JIS A4.

| Compositions of Non-Transfer Layer | |
|---|---|
| Ethylene-vinyl acetate copolymer (Vinyl acetate content of 28 wt %) | 20 wt % |
| Polyester resin (Bilon 200; manufactured by Toyobo Co.) | 60 wt % |
| Carbon black | 20 wt % |

Next, a transfer layer was formed by coating the following compositions of a thermosoftening colorant layer on the non-transfer layer so as to be 4 μm in thickness in a hot-melt method in which a gravure was used, so that a heat-transfer image recording medium of the invention was prepared.

| Compositions of Transfer Layer | |
|---|---|
| Carbon black | 20 wt % |
| Ethylene-vinyl acetate copolymer | 10 wt % |
| Paraffin wax | 50 wt % |
| Oxidized wax | 20 wt % |

A test pattern was recorded or printed on a plain paper sheet having a Beck smoothness of 20 seconds using the heat-transfer image recording medium thus prepared by means of a thermal printer having a 260 mm wide-line head, a DPI of 180 and a platten rubber hardness of 40 degrees, and the gloss, resolving power, voids and density each of the resulting transferred image were evaluated.

The results thereof are shown in Table 1, below.

The gloss, resolving power, voids, density lowering and keep-secrecy of the printed image were evaluated in the following manner:

Gloss: It was measured by making use of a glossmeter and under the conditions of the incident and reflection angles each of 60° C. When the measurements were resulted in a gloss of not more than 15 and more than 15, the results of the evaluations graded Good and Poor, respectively.

Resolving power: The blurred 1-dot ruler lines were visually observed, and no blur graded Excellent, some blur, Good, and apparent blur, Poor, respectively.

Void of transferred letter: Observations were made visually, and no void graded, Excellent, and apparent void, Poor, respectively.

Density lowering: Print was made under the conditions of 40° C. inside the thermal printer. The resulting density of lower than 1.4 graded Poor and that of not lower than 1.4, Good, respectively.

Keep-secrecy: After printed, the clearness production was visually observed. When even a partial clearness was found, it graded Poor, and no clearness at all graded Good.

EXAMPLE 2

This example was embodied in the same manner as in Example 1, except that the compositions of the non-transfer layer used in Example 1 were replaced by the following non-transfer layer compositions:

The results thereof are shown in Table 1.

| Compositions of Non-transfer Layer | |
|---|---|
| Styrene-butadiene-styrene copolymer, (Clayton G1300; manufactured by Shell Chemical) | 10 wt % |
| Polyester resin, (UE 3600; manufactured by Unitika Co.) | 80 wt % |
| Carbon black | 10 wt % |

COMPARATIVE EXAMPLE 1

A heat-transfer image recording medium comprising a support laminated thereon with a non-transfer layer and a transfer layer in order in the same manner as in Example 1, except that the compositions of the non-transfer layer used in Example 1 were replaced by the following compositions of a non-transfer layer, and the resulting heat-transfer image recording medium was evaluated.

The results thereof are shown in Table 1, below.

| Compositions of Non-transfer Layer | |
|---|---|
| Ethylene-vinyl acetate copolymer, (A vinyl acetate content: 28 wt %) | 80 wt % |
| Carbon black | 20 wt % |

COMPARATIVE EXAMPLE 2

A heat-transfer image recording medium comprising a support laminated thereon with a non-transfer layer and a transfer layer in order in the same manner as in Example 1, except that the compositions of the non-transfer layer used in Example 1 were replaced by the compositions of the following non-transfer layer, and the resulting heat-transfer image recording medium was evaluated.

The results thereof are shown in Table 1.

| Compositions of Non-transfer Layer | |
|---|---|
| Polyester resin, (Bilon 200, manufactured by Toyobo Co.) | 80 wt % |
| Carbon black | 20 wt % |

COMPARATIVE EXAMPLE 3

A heat-transfer image recording medium comprising a support laminated thereon with a non-transfer layer and a transfer layer in order in the same manner as in Example 1, except that the compositions of the non-transfer layer used in Example 1 were replaced by the compositions of the following non-transfer layer, and the resulting heat-transfer image recording medium was evaluated.

The results thereof are shown in Table 1, below.

| Compositions of Non-transfer Layer | |
|---|---|
| Polyester resin | 60 wt % |
| Carbon black | 20 wt % |
| Fluororesin particles having an average particle-size of 0.3 φ | 20 wt % |

TABLE 1

| Example | Inv. 1 | Inv. 2 | Comp. 1 | Comp. 2 | Comp. 3 |
|---|---|---|---|---|---|
| Print image gloss | Good | Good | Good | Poor | Good |
| Resolving power | Good | Excellent | Poor | Good | Poor |
| Void | Good | Good | Poor | Good | Poor |
| Density lowering | Good | Good | Poor | Poor | Poor |
| Keep-secrecy | Good | Good | Poor | Good | Good |

Evaluation

As is obvious from the above Table 1, it was confirmed that the heat-transfer image recording media of the invention are capable of producing high-quality printed images excellent in keep-secrecy, high in resolving power and few in void, as well as they have no density lowering even in high-temperature conditions.

What is claimed is:

1. A heat transfer image recording medium comprising a support having a thickness not greater than 30 μm; a heat-transfer layer, provided on said support, comprising a thermo-fusible substance, a thermoplastic polymer and a colorant; and a non-transfer layer having a thickness of 0.3 to 5 μm, which is interposed between said support and said heat-transfer layer and consists essentially of a colorant, a thermoplastic polymer selected from the following Group A and a thermoplastic polymer selected from the following Group B:

Group A: an ethylene-vinyl acetate copolymer, an ethylene-ethyl acrylate copolymer and a styrene-containing polymer;

Group B: a polyester resin, a polyurethane resin, a polyvinyl chloride resin and an epoxy resin.

2. The medium of claim 1, wherein the proportion of said polymer selected from Group A to said polymer selected from Group B is within the range of from 3:97 to 97:3 by weight.

3. The medium of claim 2, wherein the proportion of said polymer selected from Group A to said polymer selected from Group B is within the range of from 10:90 to 90:10 by weight.

4. The medium of claim 1, wherein said polymer selected from Group A and said polymer selected from Group B is contained in said non-transfer layer in an amount of not less than 10% by weight in total.

5. The medium of claim 4, wherein said polymer selected from Group A and said polymer selected from Group B is contained in said non-transfer layer in an amount of from 20% to 80% by weight in total.

6. The medium of claim 1, wherein said polymer selected from Group A has a melt index of from 1 to 3,000.

7. The medium of claim 6, wherein said polymer selected from Group A has a melt index of from 5 to 1,000.

8. The medium of claim 1, wherein said polymer selected from Group A is a styrene-containing polymer.

9. The medium of claim 1, wherein said polymer selected from Group B has a molecular weight of from 1,000 to 100,000.

10. The medium of claim 9, wherein said polymer selected from Group B has a molecular weight of from 2,000 to 50,000.

11. The medium of claim 1, wherein said polymer selected from Group B is a polyester resin.

12. The medium of claim 1, wherein said non-transfer layer contains said colorant in an amount of from 10% to 60% by weight.

13. The medium of claim 1, wherein said colorant contained in said non-transfer layer is the same as the colorant contained in said heat-transfer layer in color.

14. The medium of claim 1, wherein said non-transfer layer contains a thermo-fusible substance.

15. The medium of claim 14, wherein said thermo-fusible substance contained in said non-transfer layer is a vegetable was, an animal was, a peteroleum was, a mineral wax, a higher aliphatic acid, a higher alcohol, a higher aliphatic acid ester, an amide or a higher amine.

16. The medium of claim 14, wherein said thermo-fusible substance contained in said non-transfer layer has a melting point of from 50° C. to 120° C.

17. The medium of claim 1, wherein said thermo-fusible substance contained in said heat-transfer layer is a vegetable wax, an animal wax, a peteroleum wax, a mineral wax, a higher aliphatic acid, a higher alcohol, a higher aliphatic acid ester, an amide or a higher amine.

18. The medium of claim 17, wherein said thermo-fusible substance contained in said heat-transfer layer has a melting point of from 50° C. to 120° C.

19. The medium of claim 1, wherein said heat-transfer layer contains said thermofusible substance contains in an amount of from 30% to 90% by weight.

20. The medium of claim 1, wherein said colorant contained in said heat-transfer layer is carbon black.

21. The medium of claim 1, wherein said heat-transfer layer contains a thermoplastic resin.

22. The medium of claim 21, wherein said thermoplastic resin contained in said heat-transfer layer is an ethylene copolymer.

* * * * *

UNITED STATES PATENT AND TRADEMARK OFFICE

CERTIFICATE OF CORRECTION

PATENT NO. : 5,292,572

DATED : March 08, 1994

INVENTOR(S) : Kunihiro Koshizuka et al.

It is certified that error appears in the above-indentified patent and that said Letters Patent is hereby corrected as shown below:

Claim 15, column 10, line 37, change "was" (first occurrence) to --wax--.

Claim 15, column 10, line 37, change "was" (second occurrence) to --wax--.

Claim 15, column 10, line 37, change "was" (third occurrence) to --wax--.

Signed and Sealed this

Sixth Day of September, 1994

Attest:

Bruce Lehman

BRUCE LEHMAN

Attesting Officer

Commissioner of Patents and Trademarks